(12) United States Patent
Homm et al.

(10) Patent No.: US 7,735,618 B2
(45) Date of Patent: Jun. 15, 2010

(54) CLUTCH CONTROL DEVICE

(75) Inventors: Manfred Homm, Bühl-Neusatz (DE);
Eric Müller, Kaiserslautern (DE);
Martin Staudinger, Ettlingen (DE);
Felix Dreher, Staufen im Breisgau (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 12/283,137

(22) Filed: Sep. 8, 2008

(65) Prior Publication Data

US 2009/0139827 A1    Jun. 4, 2009

Related U.S. Application Data

(63) Continuation of application No. PCT/DE2007/000292, filed on Feb. 15, 2007.

(30) Foreign Application Priority Data

Mar. 8, 2006    (DE) .................. 10 2006 010 629

(51) Int. Cl.
*F16D 48/02*    (2006.01)

(52) U.S. Cl. ................................. 192/85 R; 192/109 F

(58) Field of Classification Search ............... 192/85 R, 192/109 F
See application file for complete search history.

(56) References Cited

U.S. PATENT DOCUMENTS

| 4,674,613 | A  | * | 6/1987  | Sikorski ................. 192/52.4 |
| 5,176,234 | A  | * | 1/1993  | Reik et al. .............. 192/53.2 |
| 6,935,480 | B2 | * | 8/2005  | Ziemer .................. 192/70.12 |
| 2001/0042667 | A1 |   | 11/2001 | Kamiya et al. ........... 192/85 C |
| 2003/0047412 | A1 |   | 3/2003  | Shiohara et al. ......... 192/109 F |
| 2004/0204280 | A1 |   | 10/2004 | Miyata et al. ............ 475/116 |
| 2004/0261551 | A1 | * | 12/2004 | Tokura et al. ............ 73/865.9 |

FOREIGN PATENT DOCUMENTS

| DE | 198 15 666 A1 | 11/1998 |
| DE | 101 05 259 A1 | 9/2001 |

* cited by examiner

*Primary Examiner*—Richard M. Lorence
(74) *Attorney, Agent, or Firm*—Alfred J. Mangels

(57) ABSTRACT

A clutch control device for controlling the operation of a hydraulically operated clutch with a flow control valve. The control device includes a volume flow regulating valve that enables both volume flow regulated filling and volume flow regulated emptying of a hydraulic clutch positioning element, to provide rapid and precise operation of the clutch.

10 Claims, 1 Drawing Sheet

US 7,735,618 B2

CLUTCH CONTROL DEVICE

CROSS-REFERENCE TO RELATED APPLICATION

This application is a continuation of International Application Serial No. PCT/DE2007/000292, having an international filing date of Feb. 15, 2007, and designating the United States, the entire contents of which is hereby incorporated by reference to the same extent as if fully rewritten.

BACKGROUND OF THE INVENTION

The present invention relates to a clutch control device for controlling the operation of a hydraulically operated clutch with a valve. The present invention also relates to a clutch, in particular a wet clutch, having a clutch control: Furthermore, the present invention relates to a power train including an engine and a transmission, in particular an automatic shift transmission, a dual clutch transmission, or a CVT transmission.

Distance-regulated or pressure-regulated valves can be used, for example, to operate a clutch by means of a hydraulic system.

An object of the present invention is to provide a clutch control device for controlling the operation of a hydraulically actuated clutch with a valve that enables rapid and precise actuation of the clutch.

SUMMARY OF THE INVENTION

The object is achieved with a clutch control device for controlling the operation of a hydraulically actuated clutch with a valve. The valve includes a volume flow regulating valve that enables both volume flow regulated filling and volume flow regulated emptying of a hydraulic clutch positioning element. The volume flow regulating valve makes it possible to control the clutch independently of the clutch force characteristic curve.

A preferred exemplary embodiment of the clutch control device is characterized in that the volume flow regulating valve includes a valve body that is movable between a filling position, in which a filling volumetric flow from a source of hydraulic medium to the clutch positioning element is released, and an emptying position in which an emptying volumetric flow from the clutch positioning element to a hydraulic medium sink is released. The valve body is preferably a valve spool that is guided so that it is movable back and forth within a valve housing, and that has control edges that release flow cross sections of different sizes in the filling or emptying direction, depending upon the position of the valve spool.

Another preferred exemplary embodiment of the clutch control device is characterized in that the volume flow regulating valve has, between the filling position and the emptying position, a closed position for the valve body, at which both volume flows are interrupted. That prevents a short circuit between the hydraulic medium source and the hydraulic medium sink when switching back and forth between the filling position and the emptying position.

Another preferred exemplary embodiment of the clutch control device is characterized in that the valve spool is biased into its emptying position by a spring that acts on one end of the valve spool. The spool is movable to its filling position by a proportional magnet that acts on the other end of the valve spool. The spring is preferably a compression spring. The proportional magnet is preferably designed so that it applies a pressure force to the valve spool when it is energized. However, other springs or proportional magnets can also be used within the scope of the present invention.

Another preferred exemplary embodiment of the clutch control device is characterized in that an orifice plate is positioned between the volume flow regulating valve and the hydraulic clutch positioning element. The pressure upstream of the orifice plate, viewed in the filling direction of the clutch positioning element, is fed back to one end of the valve spool, in particular to the end of the valve spool against which the spring acts. The pressure downstream from the orifice plate, as viewed in the filling direction of the clutch positioning element, is fed back to the other end of the valve spool, in particular to the end of the valve spool against which the proportional magnet acts. The pressure fed back causes an additional force to act on the valve spool when the clutch positioning element is being filled, the magnitude of which depends upon the volume flow rate. When the volume flow rate increases, the valve spool is returned to its emptying position by the increasing pressure differential at the orifice plate, which supports the effect of the spring force. The volume flow rate and the pressure differential are reversed when the clutch positioning element is being emptied, so that the pressure differential that occurs at the orifice plate acts in the opposite direction from when the clutch positioning element is being filled.

Another preferred exemplary embodiment of the clutch control device is characterized in that a filling orifice plate is inserted between the hydraulic medium source and the volume flow regulating valve, with the pressure upstream of the filling orifice plate being fed back to the end of the valve spool against which the spring acts, and in that the pressure downstream of the filling orifice plate is fed back to the end of the valve spool against which the proportional magnet acts. In the exemplary embodiment described in the preceding paragraph the pressure differential at the orifice plate also causes a lower pressure at the clutch. Hence, at high clutch pressures the adjustment can only occur more slowly. If one uses a larger orifice plate in order to reduce that effect, then under some circumstances an infinitesimally small pressure differential occurs at low volume flow rates.

The orifice plate must also be designed appropriately for emptying the clutch or the clutch positioning element. It is preferable here to reduce the controllability rather than to forego high volume flows, since the clutch must in any case be released very quickly in emergencies. Furthermore, the residual pressure in the clutch acts as a pressure accumulator in that functional direction. If the clutch or the clutch positioning element is almost empty, then it is no longer possible to build up a great pressure differential. Hence, the orifice plate must be large enough so that the clutch can be completely disengaged at high speed. To fulfill those different requirements for the orifice plate, the orifice plate in the form of the described filling or supply orifice plate can be placed ahead of the volume flow regulating valve, i.e., in the supply conduit.

Another preferred exemplary embodiment of the clutch control device is characterized in that an emptying orifice plate is positioned between the volume flow regulating valve and the hydraulic medium sink, with the pressure upstream of the emptying orifice plate being fed back to the end of the valve spool against which the proportional magnet acts. Since a separate orifice plate is present for each of the two flow-through directions, they can ideally be matched to the respective needs. Since the decisive factor for regulating with this valve system is only the pressure differential, not the absolute pressure in the system, it operates independently of the system pressure.

Another preferred exemplary embodiment of the clutch control device is characterized in that the volume flow regulating valve is a spring-biased 3/3 directional proportional solenoid valve. That design has proven to be especially advantageous compared to conventional directional valves.

The invention also relates to a clutch, in particular a wet clutch, having a clutch control device as described herein.

In a power train, in particular that of a motor vehicle having an engine and a transmission, in particular an automatic shift transmission, a dual clutch transmission, or a CVT transmission, the object stated earlier is achieved by the fact that a clutch as described earlier is positioned between the engine and the transmission, in particular as a startup clutch.

BRIEF DESCRIPTION OF THE DRAWINGS

Additional advantages, features, and details of the invention derive from the following description, in which various exemplary embodiments of the present invention are described in detail with reference to the drawing. The drawing figures show the following.

DESCRIPTION OF THE PREFERRED EMBODIMENTS

Figure 1:
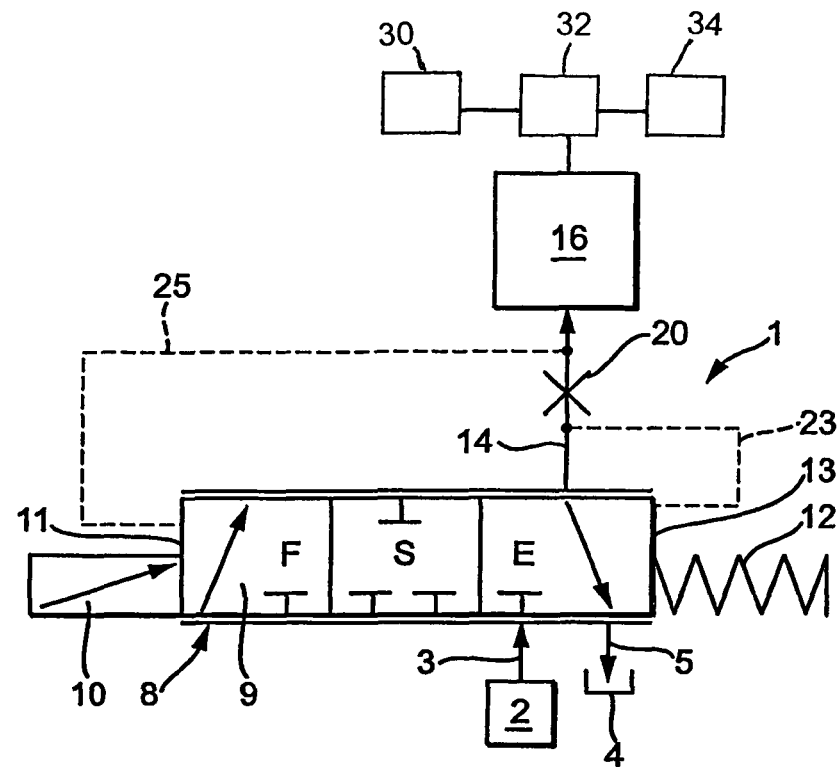
FIG. 1: a hydraulic circuit diagram of a clutch control device in accordance with a first exemplary embodiment of the present invention, having an orifice plate.

FIG. 1 shows a hydraulic circuit diagram for a clutch control device 1 in a power train including and engine 30, a clutch 32, and a transmission 34. A hydraulic medium source 2 is indicated only by a rectangle. The hydraulic medium source 2 is, for example, a hydraulic oil tank, a hydraulic oil pump, and/or a hydraulic oil pressure tank. The hydraulic medium source transports hydraulic medium, in particular hydraulic oil, into a hydraulic line, which is indicated by an arrow 3. A hydraulic medium sink is designated by 4. The hydraulic medium sink 4 is, for example, a hydraulic oil tank. An additional hydraulic line, which is indicated by an arrow 5, leads into the hydraulic medium sink 4.

Hydraulic lines 3 and 5 are connected to 3/3 directional proportional solenoid valve 8, which is also referred to as a volume flow regulating valve. Volume flow regulating valve 8 includes a valve housing, within which a valve body 9 is guided so that it can move back and forth. Valve body 9, which is also referred to as a valve spool, is movable among three different positions F, S, and E. A proportional magnet 10 acts on one end 11 of valve spool 9. A compression spring 12 acts on the other end 13 of valve spool 9. Valve spool 9 is biased by compression spring 12 to the position E shown in FIG. 1. When proportional magnet 10 is energized, valve spool 9 shifts to the right in FIG. 1, against the biasing force of compression spring 12, i.e., toward compression spring 12.

An additional hydraulic line is connected to volume flow regulating valve 8, as indicated by an arrow 14. The additional hydraulic line 14 connects volume flow regulating valve 8 to a clutch positioning element 16. Clutch positioning element 16 is, for example, a piston and cylinder unit, by which a clutch (not shown) is hydraulically actuated. An orifice plate 20 is positioned between volume flow regulating valve 8 and clutch positioning element 16. The direction of arrows 3 and 14 indicates the flow direction of the hydraulic medium when clutch positioning element 16 is being filled. A dashed line 23 indicates a pressure feedback line through which the pressure in hydraulic line 14, when viewed in the filling direction upstream of orifice plate 20, and thus away from the hydraulic medium pressure source 2, is returned to the end 13 of valve spool 9. An additional dashed line 25 indicates another pressure feedback line, through which the pressure downstream of orifice plate 20 is returned to the end 11 of valve spool 9.

Valve 8 is biased into the illustrated position E by compression spring 12. When proportional magnet 10 is energized, then valve 8 opens, which means that valve body 9 is moved to position F. In position F a volumetric flow of hydraulic fluid is released from hydraulic source 2 to clutch positioning element 16. At the same time a pressure differential builds up at orifice plate 20, whereby the higher pressure upstream of orifice plate 20 is returned to end 13 of valve spool 9. The lower pressure downstream from orifice plate 20 is returned to end 11 of valve spool 9. To set a certain volumetric flow from hydraulic source 2 into clutch positioning element 16, proportional magnet 10 must be set to a defined magnetic field strength. A rising volumetric flow brings about a higher pressure differential at orifice plate 20. The pressure differential returned through pressure return lines 23 and 25 to valve spool 9 ensures that valve spool 9 is moved far enough toward compression spring 12 so that the desired volumetric flow is restored.

If clutch positioning element 16 is to be emptied of hydraulic fluid, then the volumetric flow direction is reversed, and is also the pressure differential at orifice plate 20. However, when hydraulic fluid from clutch positioning element 16 is emptied into tank 2, the corresponding control edges of valve 8 are also reversed. Thus, the orifice plate 20, through which there is a backward flow when emptying the clutch positioning element, has a supportive effect on the magnetic force provided by proportional magnet 10. Hence in this flow direction as well, the pressure differential at orifice plate 20 acts on the relevant control edge of valve 8. Accordingly, volume flow regulating valve 8 can be used to set a defined volumetric flow both when filling and when emptying clutch positioning element 16.

Figure 2:
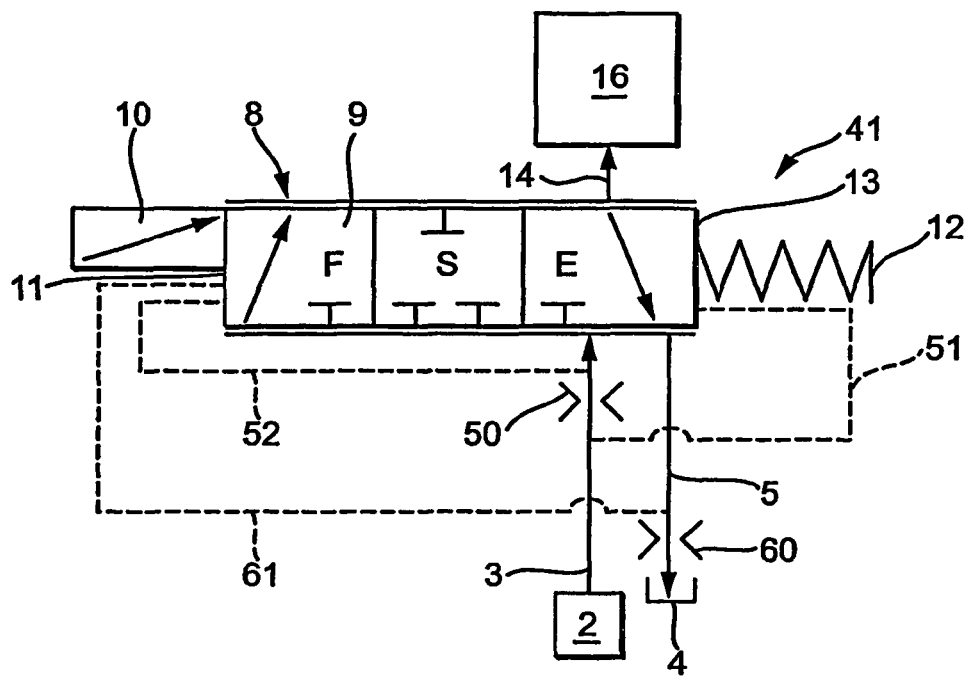
FIG. 2: a hydraulic circuit diagram of a clutch control device in accordance with a second exemplary embodiment of the present invention, having a filling orifice plate and an emptying orifice plate.

FIG. 2 shows a similar hydraulic circuit diagram as in FIG. 1. The same reference numerals are used to designate like parts. To avoid repetition, reference is made to the earlier description of FIG. 1. The next section will primarily examine the differences between the two exemplary embodiments.

FIG. 2 shows a clutch control device 41 in which the hydraulic line 3 between hydraulic source 2 and volume flow regulating valve 8 is provided with an inlet orifice 50. A dashed line 52 indicates that the pressure downstream of inlet orifice 50 is fed back to end 11 of valve spool 9. Another dashed line 51 indicates that the pressure upstream of inlet orifice 50 is fed back to end 13 of valve spool 9.

Furthermore, in the exemplary embodiment shown in FIG. 2 the hydraulic line 5 between volume flow regulating valve 8 and hydraulic sink 4 is provided with an emptying orifice plate 60. An additional dashed line 61 indicates another pressure feedback line, through which the pressure upstream of emptying orifice plate 60 is fed back to the end 11 of valve spool 9.

Since in the exemplary embodiment shown in FIG. 2 a separate orifice plate 50, 60 is provided for each of the different flow directions through valve 8, orifice plates 50, 60 can be matched ideally to the particular needs. When clutch positioning element 16 is being filled, the volumetric flow in the direction of arrow 3 causes a pressure differential at filling orifice plate 50, also referred to as the inlet orifice, which is fed back to both ends 11, 13 of valve spool 9. If clutch positioning element 16 is to be emptied, then the system pressure of hydraulic source 2 is present at both sides of filling orifice plate 50. The forces acting on valve spool 9 through pressure feedback lines 51, 52 cancel each other out. Emptying orifice plate 60 causes a back pressure, which is fed back via pressure return line 61 to end 11 of valve spool 9, and thus enables regulation of the volumetric flow rate.

What is claimed is:

1. A clutch control device for controlling the operation of a hydraulically actuated clutch, said control device comprising: a volume flow regulating valve for enabling both volume flow regulated filling and volume flow regulated emptying of a hydraulic clutch positioning element; wherein the volume flow regulating valve includes a valve spool that is movable between a filling position, in which a filling volume flow from a hydraulic medium source to the clutch positioning element is released, and an emptying position in which an emptying volume flow from the clutch positioning element is released to a hydraulic medium sink; wherein the valve spool is biased toward its emptying position by a spring that acts against one end of the valve spool, and wherein the valve spool is movable to its filling position by a proportional magnet that acts against an opposite end of the valve spool; and including an orifice plate positioned between the volume flow regulating valve and the hydraulic clutch positioning element, with a pressure on an upstream side of the orifice plate fed back to the end of the valve spool against which the spring acts, and in that a pressure downstream of the orifice plate is fed back to an opposite end of the valve spool against which the proportional magnet acts.

2. A clutch control device according to claim 1, wherein the volume flow regulating valve includes a closed position for the valve spool between the filling position and the emptying position at which both volume flows are interrupted.

3. A clutch control device according to claim 1, wherein the volume flow regulating valve is a spring-biased 3/3 directional proportional solenoid valve.

4. A wet clutch including a clutch control device in accordance with claim 1.

5. A power train for a motor vehicle, said power train comprising: an engine; a transmission; and a clutch in accordance with claim 4 positioned between the engine and the transmission as a startup clutch.

6. A power train in accordance with claim 5, wherein the transmission is selected from the group consisting of an automatic shift transmission, a dual clutch transmission, and a CVT transmission.

7. A clutch control device for controlling the operation of a hydraulically actuated clutch, said control device comprising: a volume flow regulating valve for enabling both volume flow regulated filling and volume flow regulated emptying of a hydraulic clutch positioning element; wherein the volume flow regulating valve includes a valve spool that is movable between a filling position, in which a filling volume flow from a hydraulic medium source to the clutch positioning element is released, and an emptying position in which an emptying volume flow from the clutch positioning element is released to a hydraulic medium sink; wherein the valve spool is biased toward its emptying position by a spring that acts against one end of the valve spool, and wherein the valve spool is movable to its filling position by a proportional magnet that acts against an opposite end of the valve spool; wherein a filling orifice plate is positioned between a hydraulic medium source and the volume flow regulating valve, with a pressure upstream of the orifice plate fed back to the end of the valve spool against which the spring acts; and in that a pressure downstream of the orifice plate is fed back to the end of the valve spool against which the proportional magnet acts.

8. A clutch control device according to claim 7, wherein an emptying orifice plate is positioned between the volume flow regulating valve and a hydraulic medium sink, with a pressure upstream of the emptying orifice plate fed back to the end of the valve spool against which the proportional magnet acts.

9. A clutch control device according to claim 7, wherein the volume flow regulating valve is a spring-biased 3/3 directional proportional solenoid valve.

10. A wet clutch including a clutch control device in accordance with claim 7.

* * * * *